(12) United States Patent
Rubin et al.

(10) Patent No.: US 12,339,804 B2
(45) Date of Patent: Jun. 24, 2025

(54) DATA ARCHIVING SYSTEM

(71) Applicant: OWNBACKUP LTD., Tel Aviv (IL)

(72) Inventors: Shai Rubin, Binyamina (IL); Yoav Alroy, Ramat Gan (IL); Liron Sarel, Kfar Saba (IL); Eliyahu Shua, Ben Shemen (IL); Shahar Meir, Rishon Lezion (IL)

(73) Assignee: Own Data Company, Ltd., Tel Aviv (IL)

( * ) Notice: Subject to any disclaimer, the term of this patent is extended or adjusted under 35 U.S.C. 154(b) by 0 days.

(21) Appl. No.: 18/462,481

(22) Filed: Sep. 7, 2023

(65) Prior Publication Data

US 2025/0086139 A1   Mar. 13, 2025

(51) Int. Cl.
*G06F 16/00* (2019.01)
*G06F 16/11* (2019.01)

(52) U.S. Cl.
CPC .................. *G06F 16/113* (2019.01)

(58) Field of Classification Search
CPC ..................................................... G06F 16/113
See application file for complete search history.

(56) References Cited

U.S. PATENT DOCUMENTS

| | | | | |
|---|---|---|---|---|
| 8,051,045 B2* | 11/2011 | Vogler | ................... | G06F 16/22 707/661 |
| 8,364,640 B1* | 1/2013 | Beatty | ................. | G06F 11/1469 707/640 |
| 9,684,739 B1* | 6/2017 | Ogata | ............... | G06F 16/90335 |
| 10,545,834 B1* | 1/2020 | Smith | ...................... | G06F 3/067 |
| 11,061,855 B2* | 7/2021 | Soon-Shiong | .......... | G06F 16/78 |
| 11,580,067 B1* | 2/2023 | Kuruvada | ............ | G06Q 10/063 |
| 2003/0025599 A1* | 2/2003 | Monroe | ........... | G08B 13/19691 709/200 |
| 2007/0124279 A1* | 5/2007 | Li | ........................... | G06F 16/22 |
| 2008/0263297 A1* | 10/2008 | Herbst | .................. | G06F 16/113 711/161 |
| 2009/0106331 A1* | 4/2009 | Fridman | ................. | G16Z 99/00 |
| 2010/0333116 A1* | 12/2010 | Prahlad | .................. | G06Q 30/02 713/153 |

(Continued)

OTHER PUBLICATIONS

Professional Advantage Software Solutions Inc., "Company Data Archive Recommendation—First Time Archiving ," Blog, pp. 1-4, year ???? , as downloaded from https://blog.professionaladvantage.com/search-results ?keyword=COMPANY+DATA+ARCHIVE+RECOMMENDATIONS+FIRST+TIME+ARCHIVING.

(Continued)

*Primary Examiner* — Noosha Arjomandi
(74) *Attorney, Agent, or Firm* — Meitar Patents Ltd.; Daniel Kligler

(57) ABSTRACT

In one embodiment, a system includes a processor configured to search a datastore to find records including a given field with a given value, the found records defining a dataset for consideration for archive having an aggregate data size, render to a display an indication of the aggregate data size of the dataset for consideration for archive, receive a user selection to archive at least part of the dataset, and purge the at least part of the dataset from the datastore and archive the at least part of the dataset into archive storage responsively to receiving the user selection, and a memory configured to store data used by the processor.

21 Claims, 8 Drawing Sheets

(56) References Cited

U.S. PATENT DOCUMENTS

| | | | | |
|---|---|---|---|---|
| 2014/0006357 | A1* | 1/2014 | Davis | G06F 16/182 |
| | | | | 707/667 |
| 2015/0081642 | A1* | 3/2015 | Bardini | G06F 16/113 |
| | | | | 707/662 |
| 2016/0162374 | A1* | 6/2016 | Mutha | G06F 11/3409 |
| | | | | 714/19 |
| 2016/0274805 | A1* | 9/2016 | Ohno | G06F 3/0689 |
| 2017/0286437 | A1* | 10/2017 | Stevens | G06F 16/137 |
| 2021/0224162 | A1* | 7/2021 | Karnik | G06F 11/1451 |
| 2022/0083572 | A1* | 3/2022 | Li | G06N 20/00 |
| 2024/0256484 | A1* | 8/2024 | Garg | G06F 16/13 |
| 2024/0345695 | A1* | 10/2024 | Maschmeyer | G06Q 30/0623 |

OTHER PUBLICATIONS

IFS Foundation 1, "How to Setup Data Archiving," pp. 1-3, last update Jul. 2023, as downloaded from https://docs.ifs.com/techdocs/Foundation1/040_administration/260_data_management/020_data_archiving/210_general_data_archiving/020_how_to_setup.htm.

You et al., "Evaluation of Efficient Archival Storage Techniques," Conference Paper, Symposium on Mass Storage Systems, pp. 1-6, year 2004.

Wikipedia, "Breadth-first Search," pp. 1-7, last update Aug. 19, 2023.

Wikipedia, "Depth-first Search," pp. 1-9, last update Aug. 19, 2023.

Wikipedia, "Divide-and-Conquer-Algorithm," pp. 1-6, last update Sep. 3, 2023.

Dataarchiva, "What's New With DataArchiva: Post AIKYAM 2023 Releases to Keep an Eye-On," pp. 1-4, year 2023, as downloaded from https://www.dataarchiva.com/whats-new-with-dataarchiva-post-aikyam-2023-releases-to-keep-an-eye-on/.

* cited by examiner

Fig. 3
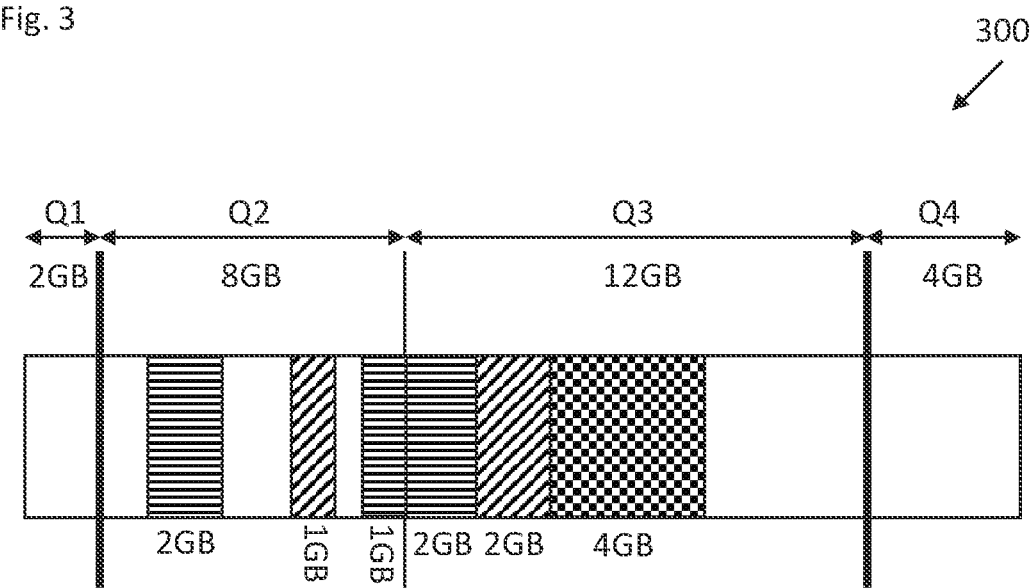
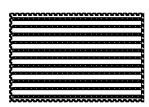 ORIGIN: EMAIL
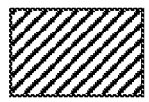 STATUS: CLOSED
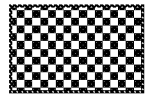 ORIGIN: EMAIL AND STATUS: CLOSED

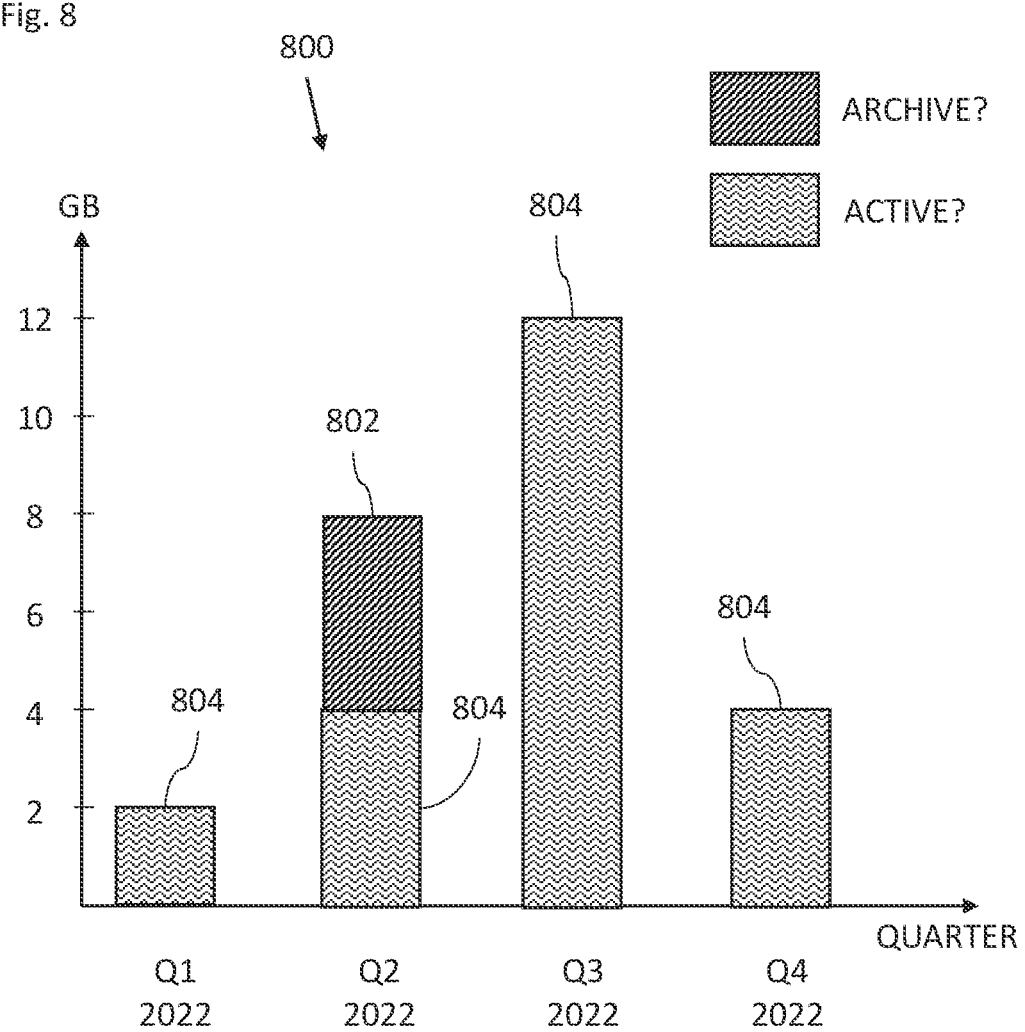

DATA ARCHIVING SYSTEM

FIELD OF THE INVENTION

The present invention relates to computer systems, and in particular, but not exclusively, to data archiving.

BACKGROUND

Organizations accumulate huge amounts of data in their databases (DBs) during years of operations. Examples of such data might include client records, orders, support cases, technical specifications, and/or resumes. This accumulation is accelerated by factors including business growth so that more data is being ingested into enterprise DBs, and organizations would typically like to keep historical data for reporting, analytics, and learning purposes. The end result is that data is added to enterprise DBs and rarely deleted or purged. Legal and compliance requirements may also limit legal entities like large organizations from deleting data.

Accumulating too much data has its drawbacks including: the cost of storing all the data; the data becomes 'dirty', e.g., duplicate records, records and tables with data integrity problems; and low performance related to finding records, producing reports, and running queries becomes less performant as the volume of data grows.

Data archiving involves moving data that is no longer actively used from a primary storage device to a secondary storage device for long-term retention. Archive data generally consists of older data that may be important to the organization or must be retained for future reference or for regulatory compliance reasons. Archived data is generally stored on a lower-cost tier of storage, serving as a way to reduce primary storage consumption and related costs. An important aspect of a business's data archiving strategy is to identify what data is a candidate for archiving.

One of the largest benefits of archiving data is to reduce the cost of primary storage, which is generally expensive as it needs to meet operational requirements for user read/write activity. In contrast, archive storage costs less, because it is typically based on a low-performance, high-capacity storage medium. Data archives can be stored on low-cost hard disk drives (HDDs), tape or optical storage that is generally slower than performance disks or flash drives.

Archive storage also reduces the volume of data that must be backed up. Removing infrequently accessed data from the backup data set improves backup and restore performance. Typically, data deduplication is performed on data being moved to a lower storage tier, which reduces the overall storage footprint and lowers secondary storage costs. Archiving data may also speed up indexing and search operations on the primary storage as the volume of data in primary storage is reduced.

SUMMARY

There is provided in accordance with an embodiment of the present disclosure, a system, including a processor configured to search a datastore to find records including a given field with a given value, the found records defining a dataset for consideration for archive having an aggregate data size, render to a display an indication of the aggregate data size of the dataset for consideration for archive, receive a user selection to archive at least part of the dataset, and purge the at least part of the dataset from the datastore and archive the at least part of the dataset into archive storage responsively to receiving the user selection, and a memory configured to store data used by the processor.

Further in accordance with an embodiment of the present disclosure the processor is configured to repeat the search of the datastore one or more times based on new search criteria to further split the found dataset or provide a new dataset for consideration for archive.

Still further in accordance with an embodiment of the present disclosure the processor is configured to find an aggregate data size of a group of records not included in the dataset for consideration for archive, and render to the display indications of the aggregate data size of the dataset for consideration for archive and the aggregate data size of the group of records not included in the dataset for consideration for archive.

Additionally in accordance with an embodiment of the present disclosure the processor is configured to find a data size of the dataset for consideration for archive for different time periods and a data size of the group of records not included in the dataset for consideration for archive for the different time periods, and render to the display a histogram indicating the data size of the dataset for consideration for archive by the different time periods and the data size of the group of records not included in the dataset for consideration for archive by the different time periods.

Moreover, in accordance with an embodiment of the present disclosure the processor is configured to divide the datastore into datasets based on any one or more of the following an enumerated field, a numeric field, a free text string, data origin type, record status, and time period.

Further in accordance with an embodiment of the present disclosure the processor is configured to divide the datastore into datasets based on the given value of, and/or an average of, a numeric field.

Still further in accordance with an embodiment of the present disclosure the processor is configured to search records of the datastore having different values of at least one field to find a maximum size dataset being defined by the records including the given field with the given value and defining the dataset for consideration for archive.

Additionally in accordance with an embodiment of the present disclosure the processor is configured to divide the maximum size dataset by different time periods to find a data size of the maximum size dataset for the different time periods, and render to the display a histogram indicating the data size of the maximum size dataset by the different time periods.

Moreover, in accordance with an embodiment of the present disclosure the processor is configured to search records of the datastore having different values and different fields yielding a plurality of datasets for respective one of the fields with respective ones of the values, and select at least two largest data size ones of the datasets for consideration for archive.

Further in accordance with an embodiment of the present disclosure the processor is configured to divide the largest data size datasets by different time periods to find respective data sizes of the largest data size datasets for the different time periods, and render to the display histograms for each of the largest data size datasets indicating the respective data sizes of the largest data size datasets by the different time periods.

Still further in accordance with an embodiment of the present disclosure the processor is configured to combine the largest data size datasets and find data sizes of the combined largest data size datasets for different time periods, and render to the display a histogram indicating the data size of the combined largest data size datasets by the different time periods.

There is also provided in accordance with another embodiment of the present disclosure, a method, including searching a datastore to find records including a given field with a given value, the found records defining a dataset for consideration for archive having an aggregate data size, rendering to a display an indication of the aggregate data size of the dataset for consideration for archive, receiving a user selection to archive at least part of the dataset, and purging the at least part of the dataset from the datastore and archive the at least part of the dataset into archive storage responsively to receiving the user selection.

Additionally in accordance with an embodiment of the present disclosure, the method includes repeating the search of the datastore one or more times based on new search criteria to further split the found dataset or provide a new dataset for consideration for archive.

Moreover, in accordance with an embodiment of the present disclosure, the method includes finding an aggregate data size of a group of records not included in the dataset for consideration for archive, wherein the rendering includes rendering to the display indications of the aggregate data size of the dataset for consideration for archive and the aggregate data size of the group of records not included in the dataset for consideration for archive.

Further in accordance with an embodiment of the present disclosure the finding includes finding a data size of the dataset for consideration for archive for different time periods and a data size of the group of records not included in the dataset for consideration for archive for the different time periods, and the rendering includes rendering to the display a histogram indicating the data size of the dataset for consideration for archive by the different time periods and the data size of the group of records not included in the dataset for consideration for archive by the different time periods.

Still further in accordance with an embodiment of the present disclosure, the method includes dividing the datastore into datasets based on any one or more of the following an enumerated field, a numeric field, a free text string, data origin type, record status, and time period.

Additionally in accordance with an embodiment of the present disclosure the dividing includes dividing the datastore into datasets based on the given value of, and/or an average of, a numeric field.

Moreover, in accordance with an embodiment of the present disclosure the searching includes searching records of the datastore having different values of at least one field to find a maximum size dataset being defined by the records including the given field with the given value and defining the dataset for consideration for archive.

Further in accordance with an embodiment of the present disclosure, the method includes dividing the maximum size dataset by different time periods to find a data size of the maximum size dataset for the different time periods, wherein the rendering includes rendering to the display a histogram indicating the data size of the maximum size dataset by the different time periods.

Still further in accordance with an embodiment of the present disclosure the searching includes searching records of the datastore having different values and different fields yielding a plurality of datasets for respective one of the fields with respective ones of the values, the method further including selecting at least two largest data size ones of the datasets for consideration for archive.

Additionally in accordance with an embodiment of the present disclosure, the method includes dividing the largest data size datasets by different time periods to find respective data sizes of the largest data size datasets for the different time periods, wherein the rendering includes rendering to the display histograms for each of the largest data size datasets indicating the respective data sizes of the largest data size datasets by the different time periods.

Moreover, in accordance with an embodiment of the present disclosure, the method includes combining the largest data size datasets and find data sizes of the combined largest data size datasets for different time periods, wherein the rendering includes rendering to the display a histogram indicating the data size of the combined largest data size datasets by the different time periods.

There is also provided in accordance with still another embodiment of the present disclosure a software product, including a non-transient computer-readable medium in which program instructions are stored, which instructions, when read by a central processing unit (CPU), cause the CPU to search a datastore to find records including a given field with a given value, the found records defining a dataset for consideration for archive having an aggregate data size, render to a display an indication of the aggregate data size of the dataset for consideration for archive, receive a user selection to archive at least part of the dataset, and purge the at least part of the dataset from the datastore and archive the at least part of the dataset into archive storage responsively to receiving the user selection.

BRIEF DESCRIPTION OF THE DRAWINGS

The present invention will be understood from the following detailed description, taken in conjunction with the drawings in which:

FIG. 3 is a schematic view of an example storage pattern in the system of FIG. 1; and FIGS. 4-8 are examples of histograms showing data for archive in the system of FIG. 1.

DESCRIPTION OF EXAMPLE EMBODIMENTS

Overview

Figure 1:
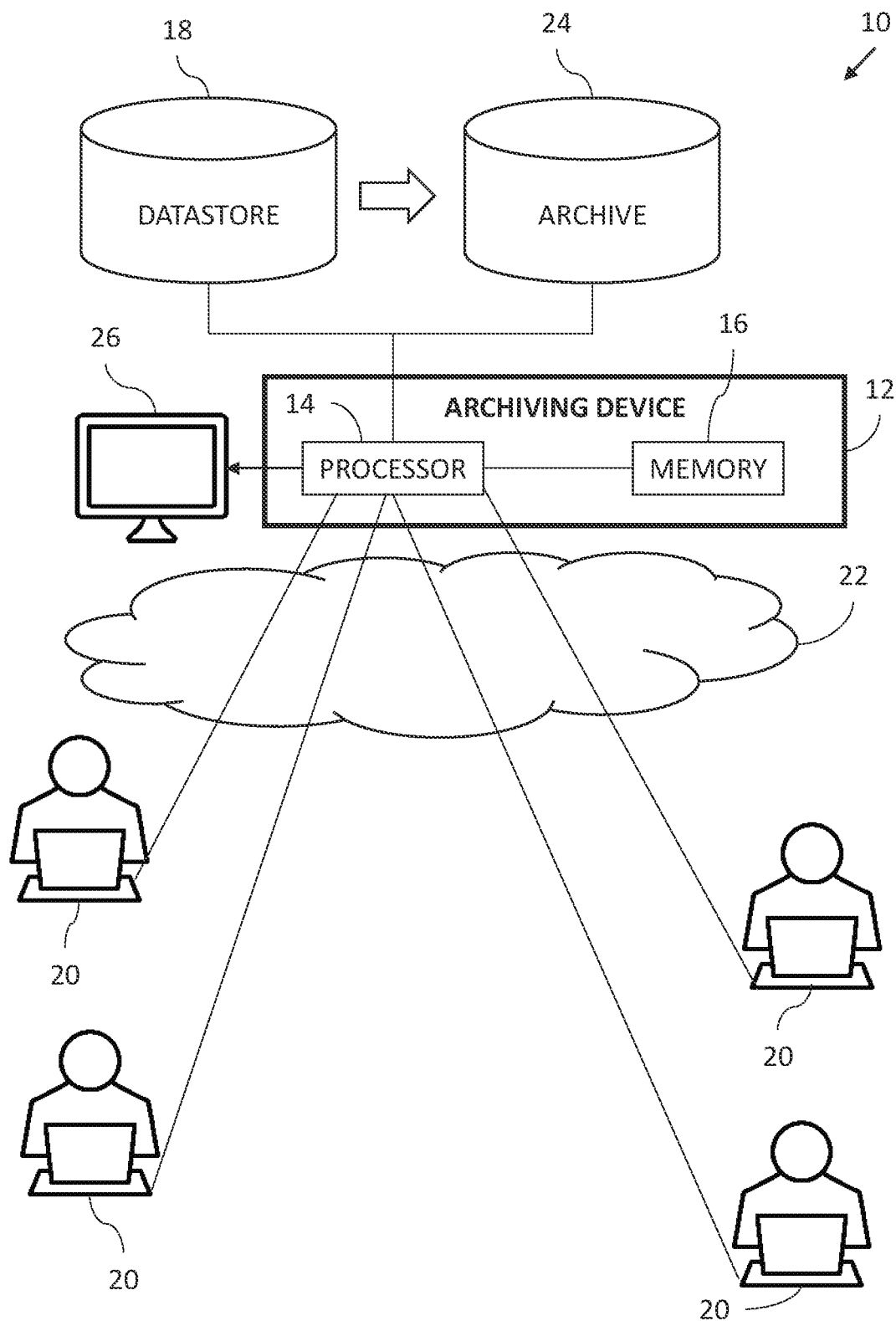
FIG. 1 is a block diagram view of an archiving system constructed and operative in accordance with an embodiment of the present invention.

While archiving seems straightforward logically, selecting the subset of the data that should be moved to the secondary storage might turn out to be more complicated than originally thought. Furthermore, even when a subset of the data is defined logically, implementing an archiving strategy that would actually archive the desired data is restricted with various non-business, but technical limitations.

There are several factors that an administrator may want to keep in mind when selecting the data and then building an archiving strategy. One factor relates to removing data from primary storage that might affect many users in the organization, and business stakeholders that should be aware and agree to the effect of archiving. Another factor is DB-Schema dependency, for example, if one archives objects of type X then one should also archive objects of type Y because Y has no relevance without X. The order of deletion of objects may also be important, for example, we want to archive 'heavy' objects first so the reduction in storage size would be maximized quicker. Technical factors such as API limit, DB throughput, and business logic that groups objects that can either be deleted together or kept together in the primary storage need to be considered. Timing of the archive operation needs to be considered and typically timed to be done during non-business hours. Legal constraints also need to be considered as there are cases where archiving should be performed in a timely fashion due to legal requirements, like a court order.

The following is an example which illustrates the dilemmas and considerations for a simple archiving strategy. Assume that data has been accumulating in the DB for the last 10 years and the storage cost has already reached $1 M. Also, the large size of the DB affects responsiveness of the DB and end users are complaining of slowness. Archiving data becomes an attractive option to reduce cost, and improve performance. After initial analysis, the administrator notices that the "Case" table consumes 45% of the overall DB storage. The administrator decides to start archiving "Case" records. The administrator obtains business unit approval to archive all Case records older than 6 years as such records are almost never required for the day-to-day operation of the business. However, the administrator has the following concerns. First, how much storage would be saved when archiving 6 years of "Case" records. The amount of storage saved by deleting "Case" records older than 6 years cannot generally be determined without thorough analysis. Second, how long would it take to archive those "Case" records. There might be technical limitations that cause the process to take several weeks, if not months. Third, in what order should the old "Case" records be archived. Each record might have a different size, and the administrator may want to start with the 'heaviest' records first. Also, each record might take different time to archive-large size records might take a longer time to archive than smaller size records.

Let us assume that the administrator has 60 million "Case" records that are older than 6 years, and the total savings from this archiving operation is 500 GB. Typically, administrators have no tools to address the concerns described above. Therefore, they are inclined to use a naive strategy which, as illustrated below, is far from optimal. In a naive strategy, the administrator writes a simple query that selects all "Case" records older than 6 years and starts archiving. Most modern databases would return records in the DB administration default order. Unfortunately, in this default order DB storage reduction size is slow due to starting with purging very small objects first. Only after approximately 2.5 months of archiving will there be a saving of about 50% of the potential storage savings from archiving "Case" records. However, if the administrator defines a more sophisticated strategy in which they use a different order (e.g., in which they archive first the 'heaviest' records first) they can reduce the storage size of "Cases" by 50% after 2 weeks, for example.

Therefore, embodiments of the present invention address at least some of the above drawbacks and challenges by providing an archiving system which builds a beneficial archiving strategy in which the primary storage data can be archived efficiently while providing visibility to the DB administrator of the potential storage savings and the impact to the organization, and complying with various technical and business requirements. The system provides visibility of which objects/records are going to be deleted and archived.

In some embodiments, the archiving system finds one or more datasets of the data in the primary storage that maximize the benefit of archiving given a set of constraints such as: do not archive orders from the last 5 years (because they are frequently used to help clients identify missing items), do not archive open cases, do not archive opportunities that have a status of 'Close Lost', archive only resumes of candidates interviewed more than 10 years ago. Many other examples of constraints are possible.

In some embodiments, the archiving system finds one or more datasets by dividing or splitting the data according to any suitable criteria (e.g., provided by the administrator and/or determined by the archiving system) in order to provide information about what data to consider for archive. The data size of the dataset(s) is also found and rendered to a display to show the administrator the data size(s) of the dataset(s) for potential archive. The data size of data not suggested for potential archive may also be rendered to the display to provide the administrator with a comparison to see the effect of the potential archive. The search may be further refined using different or additional criteria to provide different datasets which may include further splitting the found dataset(s). The refinement process may be performed multiple times, as necessary, with the data size of the dataset(s) being rendered to the display at each refinement stage to show the administrator the data size(s) of the dataset(s) for potential archive. The search criteria at each refinement stage may be provided by the administrator and/or automatically suggested by the system. The administrator may then select one or more of the datasets for archive. The data is then purged from the primary storage and optionally archived to secondary storage.

The archiving system may divide or split the data according to an enumerated field, a numeric field, a free text string, data origin type, record status, and/or time period. By way of example, data may be split by geographical region. For example, one of the datasets may be records for clients in the UK. For example, the data may be split according to values of a numeric field based on a given value of, and/or an average of, the numeric field. For example, the data may be split based on an average value of transactions so that transactions below the average value form one dataset for potential archive and transactions above the average value from another dataset not for potential archive.

The data may be split according to time-period, e.g., quarterly, or monthly, and rendered to a display, e.g., as a histogram or any suitable presentation mode, to show the size of the potential archive data per time-period. For example, the split may reveal that data older than 2 years up to 10 years only uses 5% of the primary storage, but data in the last 2 years uses 95% of the primary storage. Therefore, if the retainment policy is 2 years, archiving is not very useful, and the archiving policy needs to be changed or more primary storage needs to be purchased. Therefore, the data split provides an insight to the administrator.

A previously split dataset, e.g., clients in the UK, may also be further split by time-period, e.g., quarterly, or monthly, and rendered to the display, e.g., as a histogram, to show the size of potential archive data (e.g., for clients in the UK) by time period. The administrator may then select one or more of the datasets for archive. For example, the administrator may select clients in the UK for quarters 1 and 2 last year to be purged from the primary storage and optionally archived to secondary storage.

The data may be split according to any field value, such as case status with a value equal to closed or case origin with a value equal to email. Data may be split by two or more field values. For example, one of the datasets may include records for clients in the UK and one of the subsets may include records for clients in France. Data may also be split according to two or more different types of fields. For example, one of the datasets may be clients in the UK and one of the datasets may be case status with a value equal to closed. Each of the datasets may be displayed together, e.g., on the same histogram, or a separately, e.g., on different histograms, or any suitable presentation mode.

In some embodiments, a data subset may be a combination of two or more field values of the same field or different fields. For example, a data subset may be formed from clients in the UK with a status of closed, or clients in the UK or cases with a status of closed.

The fields and/or values used to split or divide the data may be selected by the administrator. For example, the administrator may know that certain data records are infrequently used, such as clients from France. Therefore, the field "client" with the value "France" may be used to split the data and provide a dataset for consideration for archive including clients from France. For example, if administrator knows that emails are using a lot of the primary storage, the search may be limited to looking at emails and not for other data. The administrator may provide a combination for field values for splitting or combining.

In some embodiments, the system may search the data to find a given field with a given value yielding a maximum size dataset. For example, the maximum size dataset may be found for records where the original field is equal to email. The maximum size dataset may then be used to provide the dataset for consideration for archiving. In some cases, more than one dataset representing the largest datasets in the data may be found to provide the dataset(s) for consideration for archiving. The maximum size dataset or largest datasets may be further split, for example, by time period and displayed, e.g., using a histogram or other presentation mode.

Embodiments of the present invention improve the way a computer or other processing device works by providing faster archiving selection, providing a faster archive process, increasing available storage space which may lead to higher data access speeds, reduced power consumption, and reduced bandwidth requirements for storage device read/writes among other improvements.

System Description

Reference is now made to FIG. 1, which is a block diagram view of an archiving system 10 constructed and operative in accordance with an embodiment of the present invention. The system 10 includes an archiving device 12 including a processor 14 and a memory 16 configured to store data used by the processor 14. Data may be written to a datastore 18 (e.g., primary storage) and retrieved from the datastore 18 by various entities including user terminals 20 via a suitable computer network 22, e.g., a local area network or the Internet. The system 10 may include an archive storage unit 24 for storing archived data purged from the datastore 18. The system may also include a display device 26 to which to render various archive reports described in more detail with reference to FIGS. 2-8.

In practice, some, or all of the functions of the processor 14 may be combined in a single physical component or, alternatively, implemented using multiple physical components. These physical components may comprise hard-wired or programmable devices, or a combination of the two. In some embodiments, at least some of the functions of the processor 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
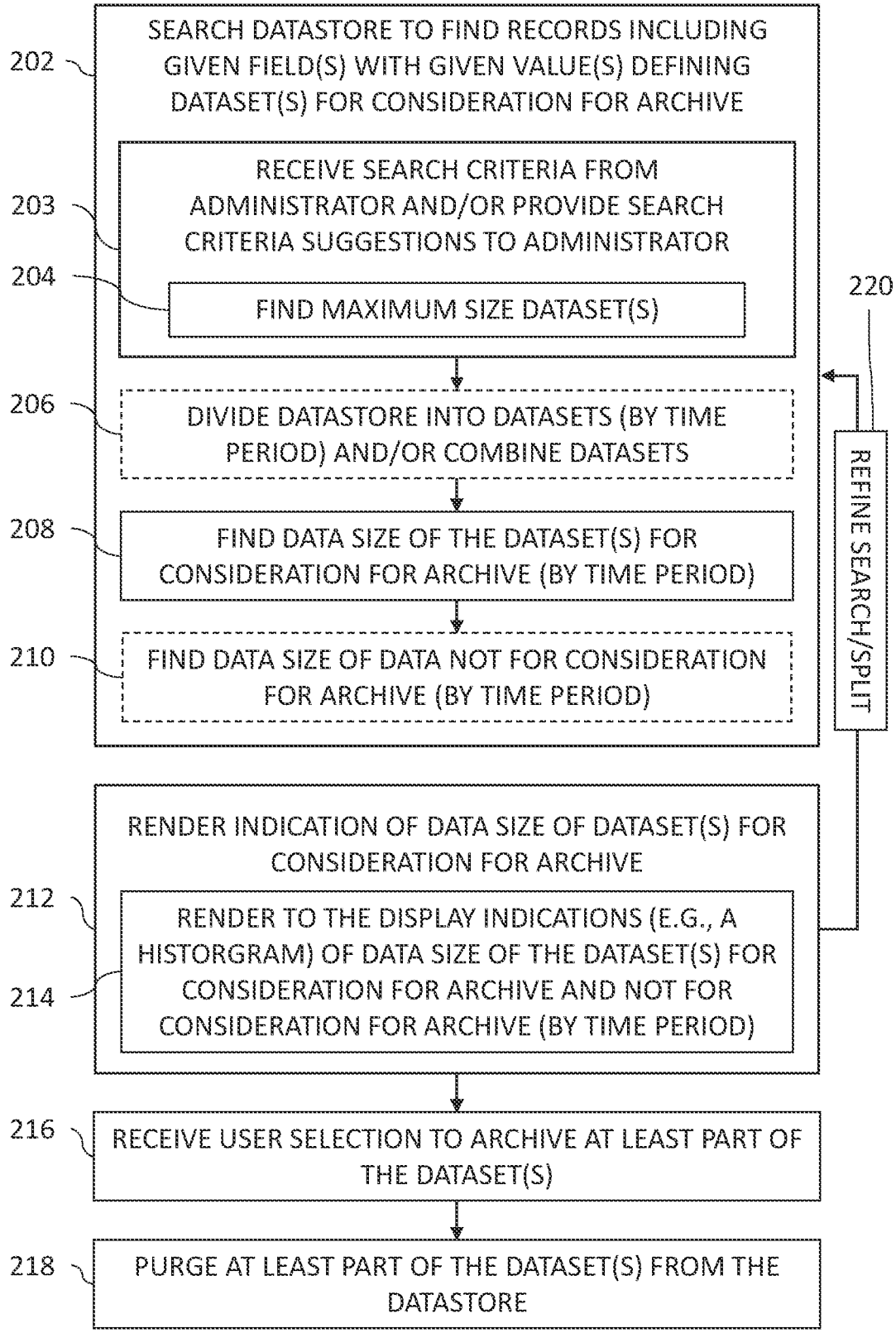
FIG. 2 is a flowchart including steps in a method of operation of the archiving system of FIG. 1.

Reference is now made to FIG. 2, which is a flowchart 200 including steps in a method of operation of the archiving system 10 of FIG. 1. The processor 14 is configured to search the datastore 18 to find records including a given field (or fields) with a given value (or given corresponding values, e.g., field 1 with value A and field 1 with value B, or field 1 with value A and field 2 with value C) (block 202). The found records define a dataset (or datasets) for consideration for archive having an aggregate data size (or aggregate data sizes). The aggregate data size of the dataset is the data size of the sum of the sizes of the individual records included in the dataset. The processor 14 may be configured to receive the search criteria, such as given field(s) and given value(s) from the administrator. Alternatively, or additionally, at least some of the given field(s) and given value(s) may be determined by the processor 14 of the archiving device 12 (block 203), as described in more detail with reference to FIG. 3. In some cases, when the given field(s) and given value(s) are determined by the processor 14, the given field(s) and given value(s) are rendered to the display device 26 as suggestions to the administrator to accept or override as criteria for the search.

Reference is now made to FIG. 3, which is a schematic view of an example storage pattern 300 in the system 10 of FIG. 1. Reference is also made to FIG. 2. In the example storage pattern 300 of FIG. 3, data for a whole year is shown. The data is divided by time period into four quarters, namely, quarter 1 (Q1), quarter 2 (Q2), quarter 3 (Q3), and quarter 4 (Q4). Q1 includes 2 GB of data, Q2 includes 8 GB of data, Q3 includes 12 GB of data, and Q4 includes 4 GB of data. The two largest datasets are records having an origin field with the value of email, and records having a status field with the value of closed. Q2 includes 3 GB of data with origin equal to email and 1 GB of data with status equal to closed. Q3 includes 2 GB of data with origin equal to email, 2 GB of data with status equal to closed, and 4 GB of data with origin equal to email and status equal to closed. The example of FIG. 3 is used below to provide examples for various steps in the method of FIG. 2.

The processor 14 is configured to search records of the datastore 18 having different values of at least one field to find a maximum size dataset being defined by the records including a given field (e.g., origin) with a given value (e.g., email) and defining the dataset for consideration for archive (block 204). For example, the administrator may specify a given field (e.g., status or origin) for searching, and the processor 14 may be configured to search records of the datastore 18 having different values of the given field (provided by the administrator) to find the maximum size dataset for that given field. For example, the administrator may specify "country" as the field. The processor 14 may then search the different values of the country field (e.g., USA, UK, France) to determine the country yielding the maximum size dataset for one of the values of the country field. In some cases, the administrator may specify a value of a field and specify another field on which the processor 14 should find a maximum size dataset. For example, the administrator may specify a value for the country field (e.g., UK) and the city field with which the processor 14 should find the maximum size dataset for the specified value of the country field so that the processor 14 searches the cities in the UK to find the records including the city defining the maximum size dataset.

In some cases, the processor 14 may be configured to search records of the datastore 18 having different values of all fields (in one or more database tables, optionally selected by the administrator) to find the maximum size dataset.

In some embodiments, the processor 14 is configured to search records of the datastore 18 having different values and different fields (e.g., all fields) yielding a plurality of datasets for respective one of the fields with respective ones of the values, and select at least two largest data size datasets for consideration for archive. In the example of FIG. 3, the processor 14 searched the datastore 18 and found the maximum size dataset was for the "origin" field with the value equal to "email". The second largest size dataset found in the datastore 18 was for the "status" field with the value equal to "closed".

In some embodiments, the processor 14 is configured to search the datastore 18 to find the values of a field individually yielding the smallest (e.g., 10 smallest) datasets but being suggested by the processor 14 to the administrator for archiving as a whole group. For example, the largest datasets for cities in the UK may include records for London and Birmingham. However, the processor 14 may find the smallest datasets for other UK cities (e.g., Oxford, Sunderland, and Hull) which as a group represent a significant archive target but may represent a lower business impact.

In some embodiments, the processor 14 is configured to divide the datastore 18 or the maximum size dataset by different time periods (e.g., years, quarters, or months) to find a data size of the maximum size dataset for the different time periods. In some embodiments, the processor 14 is configured to divide the datastore 18 or the maximum size dataset by any suitable field value or combine datasets (block 206) as described in more detail below.

In a case where there is more than one found dataset, the processor 14 may be configured to divide the largest data size datasets by different time periods to find respective data sizes of the largest data size datasets for the different time periods. For example, the data size of the dataset with email as origin is divided by different time periods, and the data size of the dataset with closed as status is divided by different time periods as illustrated by the storage pattern 300 of FIG. 3.

The processor 14 may be configured to combine the largest data size datasets (e.g., one dataset having records with the "origin" field having a value equal to "email", and another dataset having records with the "status" field having a value equal to "closed") and find data sizes of the combined largest data size datasets for different time periods. In other words, the processor 14 combines the datasets based on records having: (1) "origin" field with the value equal to "email"; OR (2) "status" field with the value equal to "closed". In the example of FIG. 3, the combination of the datasets is given by 4 GB of data for consideration for archive in Q2 and 8 GB of data for consideration for archive in Q3.

In some cases, combining may be defined as finding the intersection between datasets. For example, the intersection may be defined as records having: (1) "origin" field with the value equal to "email"; AND (2) "status" field with the value equal to "closed". In the example of FIG. 3, the intersection is shown with a checkered pattern and includes 4 GB of data in Q3.

The processor 14 may be configured to divide (and/or combine) the datastore 18 into datasets based on any one or more of the following: an enumerated field; a numeric field; a free text string; data origin type; record status; and time period. In some embodiments, the division and/or combination of data may be performed with respect to one or more database tables specified by the administrator.

An enumerated field is generally a field with predefined values such as cities, states, or countries which are selected from predefined lists. Other examples may include device types, makes, models, or departments.

A numeric field is any field defined by number only, such as, price, weight, size. A numeric field may be used to split data. The processor 14 may be configured to find a dataset including records based on a value of a numeric field. For example, the processor 14 may be configured to find a dataset of records including a given numeric field having values satisfying one or more of the following: greater than value A; less than value A; equal to value A; between values A and B; and/or values greater (or less) than the average (or median, mean, mode etc.) of all the values in that numeric field. In some embodiments, the processor 14 is configured to divide the datastore 18 into datasets based on the given value of, and/or an average of, a numeric field. For example, the processor 14 may divide the datastore 18 into two datasets, one dataset with records of a given numeric field having values less than the average value, another dataset with records of the given numeric field having values greater than or equal to the average value.

A string may include any free text value, e.g., the subject of an email. The processor 14 may be configured to find a dataset including records with a value or values of a string field, e.g., find the most common word(s) in the subject of emails and split the datastore 18 by that most common word(s) for example.

The data origin type may specify from where the record originated and/or how the record originated. For example, the data origin may include such values as email, sales records, phone call records, etc. The status field may have such values, as active, and closed.

Finding one or more datasets from datastore 18 or splitting the datastore 18 into two or more datasets (e.g., one or more datasets for consideration for archive and one or more datasets for retaining in the datastore 18) may be found using any suitable search algorithm. In some embodiments, the search algorithm may include the following steps: (1) determine which database table (e.g., cases) and/or record type (e.g., emails or transaction records) to limit the search to. In some cases, the search may cover the whole datastore 18; (2) determine which field(s) and/or value(s) of fields to search. The fields and/or values may be provided by the administrator. In some embodiments, if no field(s) and/or value(s) are suggested by the administrator, the archiving device 12 assumes that all fields and values may be searched to find the maximum size dataset or largest size datasets, for example. The search criteria determined by the archiving device 12 may be suggested to the administrator for approval or for being overridden; (3) the archiving device 12 may then search the datastore 18 which may be limited to specified database table(s) and/or record type(s), and/or fields and/or field value(s) to find a dataset or datasets such as a maximum size dataset and/or largest size datasets. The search algorithm could be based on A* search algorithm, for example. Steps 1-3 may be repeated with different fields and/or field values to further refine and/or split (or divide) the datastore 18 to reveal different datasets (block 220) as described in more detail below. For example, the data may be first split by country, and then by time period (e.g., quarter) and then by status, and then by origin, and so on. After each split, the results of the split may be displayed on the display device 26 to allow the administrator to analyze the results and make further split suggestions and/or select datasets for archive.

The processor 14 may provide the split detections based on the largest size datasets. The display of results is described in more detail with reference to FIGS. 4-8.

As part of the search step(s), the processor 14 finds the size of the dataset(s) for consideration for archive and optionally the size of the datasets for retaining in the datastore 18 (i.e., not for archive). Therefore, the processor 14 is configured to find an aggregate data size of a group of records in the dataset for consideration for archive (block 208). In some embodiments, the processor 14 is configured to find an aggregate data size of the group of records in the dataset for consideration for archive for different time periods (e.g., quarterly). In some embodiments, the processor 14 is configured to find an aggregate data size of a group of records not included in the dataset for consideration for archive (block 210). In some embodiments, the processor 14 is configured to find a data size of the group of records not included in the dataset for consideration for archive for the different time periods.

Reference is now made to FIGS. 4-8, which are examples of histograms showing data for archive in the system 10 of FIG. 1. Reference is also made to FIG. 2. In general, the processor 14 is configured to render to the display device 26 an indication of the aggregate data size of the dataset for consideration for archive (block 212) and optionally the aggregate data size of the group of records not included in the dataset for consideration for archive (block 214). The indication(s) may be provided using any form of presentation, for example, in the form of text, or in the form of a graph, such as a histogram or pie chart.

In some embodiments, the processor 14 is configured to render to the display device 26 a histogram indicating the data size of the dataset for consideration for archive by the different time periods and the data size of the group of records not included in the dataset for consideration for archive by the different time periods. An example of such a histogram is shown in FIGS. 4 and 5.

Figure 4:
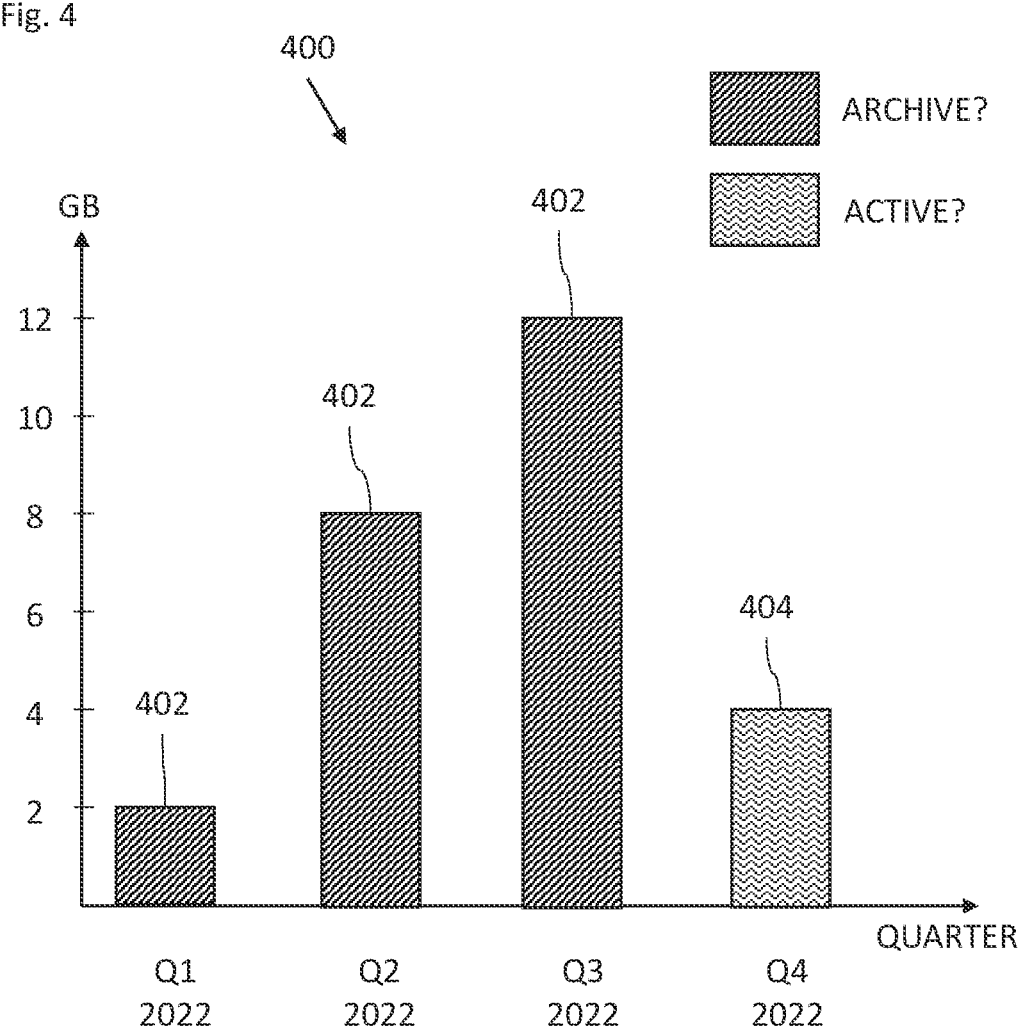

Reference is now made to FIG. 4, which shows a view of a histogram 400 showing datasets 402 for archive in Q1-Q3, and an active dataset 404 (not for archive) in Q4 based on the data in the datastore 18 according to the example storage pattern 300 of FIG. 3. Histogram 400 may result from splitting the data stored in the datastore 18 by time period and specifying that data older than Q4 should be considered for archive.

Figure 5:
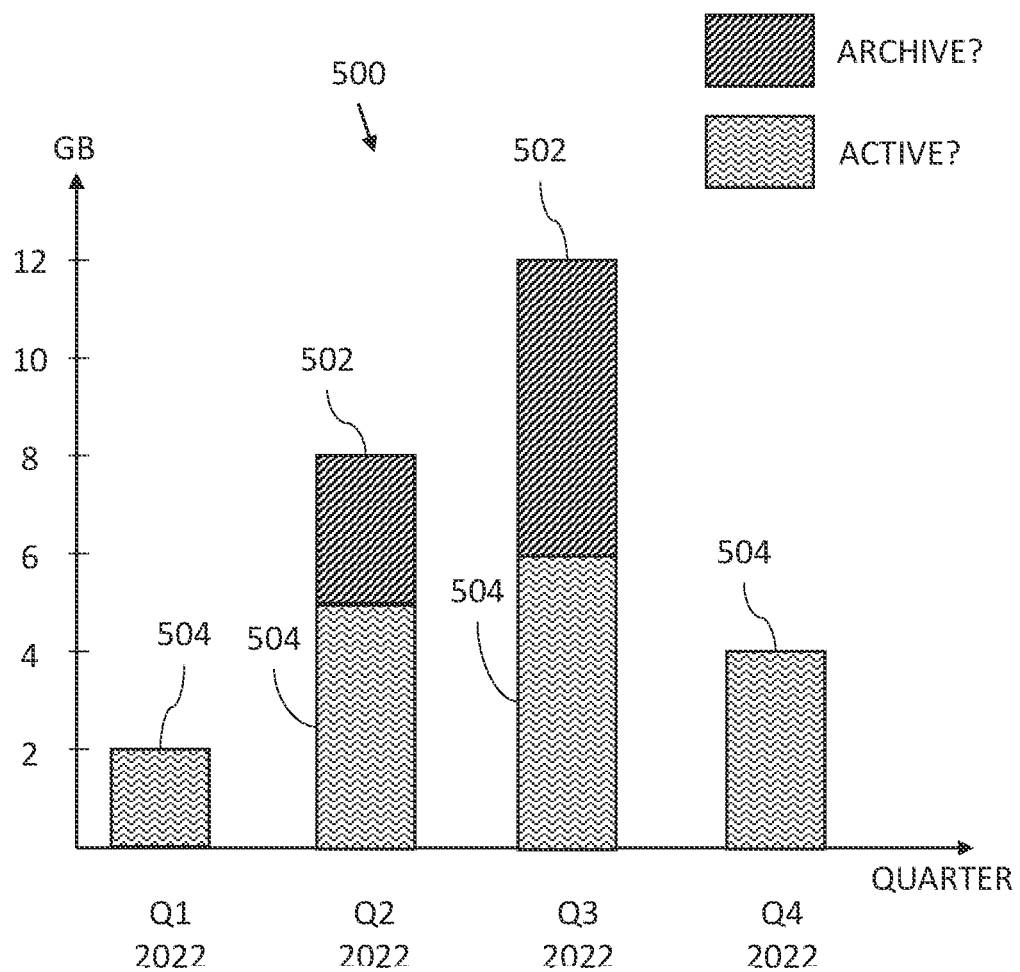

Reference is now made to FIG. 5, which shows a histogram 500 showing datasets 502 for records with "origin" field equal to "email" for cases older than Q4 for consideration for archive (darker pattern) by time period, as well as datasets 504 for remaining records in the datastore 18 not for consideration for archive (lighter pattern) by time period. The data sizes shown in FIG. 5 are based on the example storage pattern 300 of FIG. 3. For example, FIGS. 3 and 5 show 3 GB of email origin data in Q2 and 6 GB of email origin data in Q3. The field "origin" with value "email" is the largest dataset in the storage pattern 300 of FIG. 3. The processor 14 is configured to render to the display device 26 the histogram 500 indicating the data size of the maximum size dataset(s) 502 by the different time periods (Q1-Q4).

Figure 6:
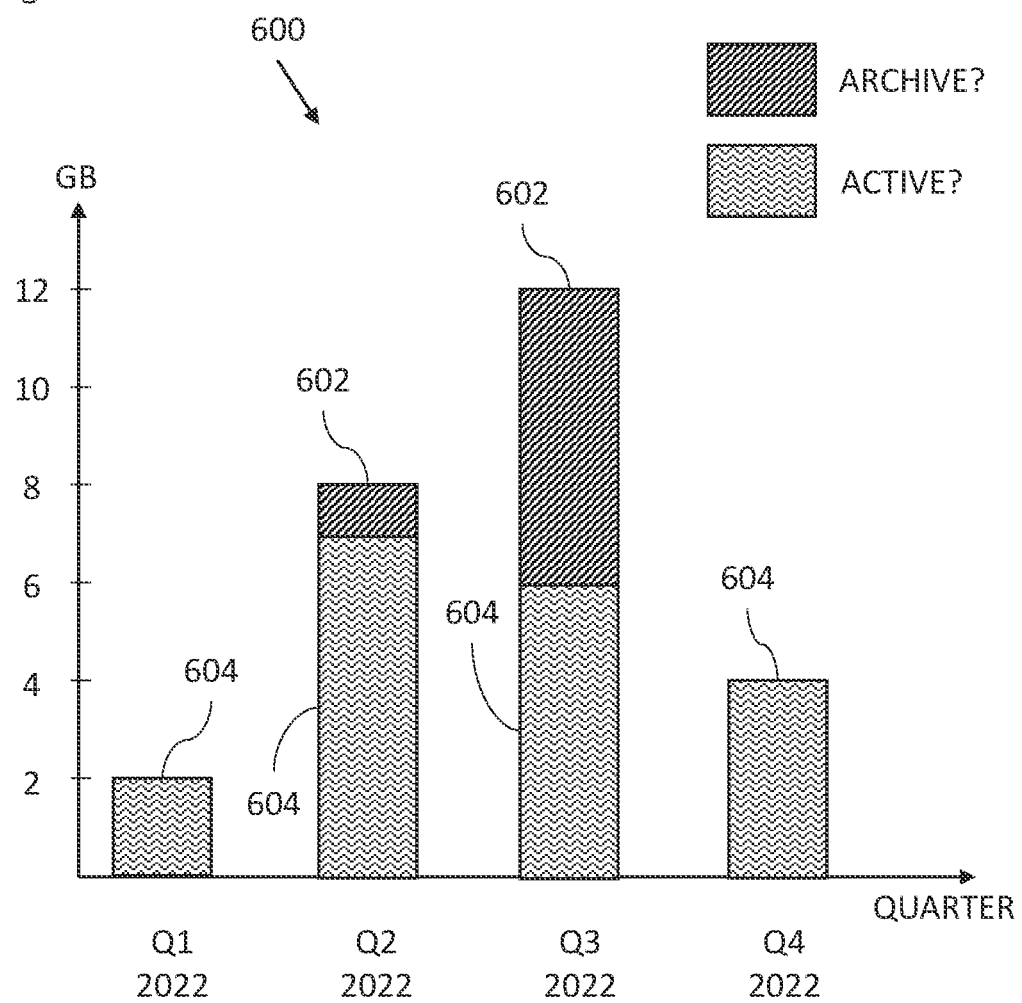

Reference is now made to FIG. 6, which shows a histogram 600 showing datasets 602 for records with "status" field equal to "closed" for cases older than Q4 for consideration for archive (darker pattern) by time period as well as datasets 604 for remaining records in the datastore 18 not for consideration for archive (lighter pattern) by time period. The data sizes shown in FIG. 6 are based on the example storage pattern 300 of FIG. 3. For example, FIGS. 3 and 6 show 1 GB of closed status data in Q2 and 6 GB of closed status data in Q3. The field "status" with value "closed" is the second largest dataset in the storage pattern 300 of FIG. 3. Therefore, FIGS. 5 and 6 are examples of histograms rendered by the processor 14 for the two largest data size datasets. In some embodiments, the processor 14 is configured to render to the display device 26 histograms 500, 600 for each of the largest data size datasets, respectively, indicating the respective data sizes of the largest data size datasets by the different time periods (e.g., Q1-Q4).

Figure 7:
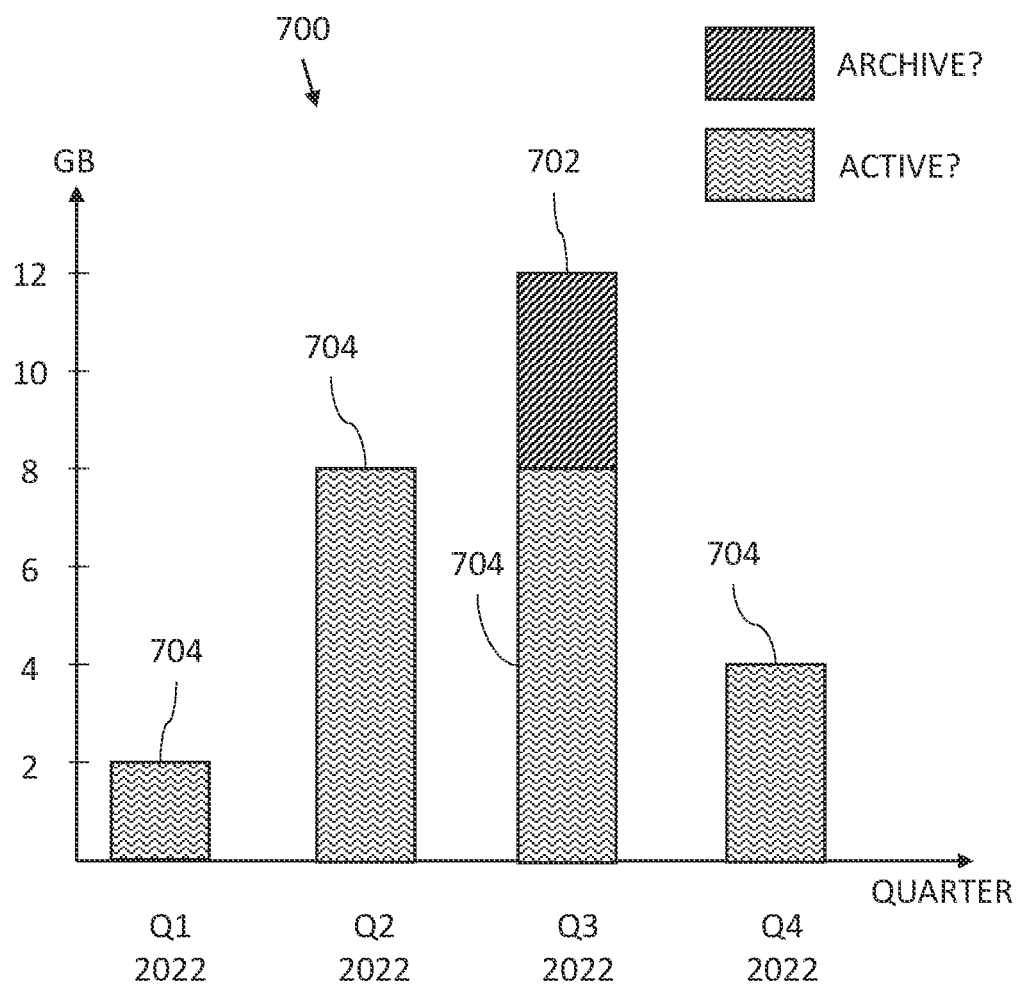

Reference is now made to FIG. 7, which shows a histogram 700 showing a dataset 702 for records with "status" field equal to "closed" AND "origin" field equal to "email" for cases older than Q4 for consideration for archive (darker pattern) by time period as well as datasets 704 for remaining records in the datastore 18 not for consideration for archive (lighter pattern) by time period. The data sizes shown in FIG. 7 are based on the example storage pattern 300 of FIG. 3. For example, FIGS. 3 and 7 show 4 GB of records with "status" field equal to "closed" AND "origin" field equal to "email" in Q3.

Reference is now made to FIG. 8, which shows a histogram 800 showing a dataset 802 for records with "status" field equal to "closed" OR "origin" field equal to "email" for cases older than Q3 for consideration for archive (darker pattern) by time period as well as datasets 804 for remaining records in the datastore 18 not for consideration for archive (lighter pattern) by time period. The data sizes shown in FIG. 8 are based on the example storage pattern 300 of FIG. 3. For example, FIGS. 3 and 8 show 4 GB of records with "status" field equal to "closed" OR "origin" field equal to "email" in Q2.

FIGS. 7 and 8 are examples of combining data from the largest datasets in different ways. FIG. 7 combines the data with a logical AND, while FIG. 8 combines the data with a logical OR. Therefore, in some embodiments the processor 14 is configured to render to the display device 26 the histogram 700, 800 indicating the data size of the combined largest data size datasets by the different time periods (e.g., Q1 to Q4).

Reference is again made to FIGS. 1 and 2.

The processor 14 may be configured to repeat the search of the step of block 202 one or more times to refine the search results based on new search criteria providing a new dataset(s) for consideration for archive or further split the found dataset(s) based on new search criteria (block 220). The new search criteria may be provided by the administrator and/or determined by the archiving device 12 and suggested to the administrator for approval or being overridden.

For example, the administrator may specify "region" as the field. The processor 14 may then search the different values of the region field (e.g., Europe, Asia, etc.) to determine the region (e.g., Europe) yielding the maximum size dataset. The processor 14 may then perform the search based on Europe. The processor 14 may then suggest to the administrator to further split the search by country and may suggest countries in Europe providing the largest groups (e.g., Germany and France) and then proceed to perform the search based on the suggested countries.

For example, if the administrator provided London and Liverpool as UK cities as search criteria in the first search, the administrator may decide to replace Liverpool with Manchester in the second search. Alternatively, the archiving device 12 may compute (e.g., in the background) that Manchester provides a larger dataset than Liverpool and therefore suggest Manchester as the new search criteria.

By way of another example, the administrator selected the last 8 quarters for potential archive and the archiving device 12 performed the search based on the last 8 quarters. The archiving device 12 may compute (e.g., in the background) that including the last 9 quarters in the archive provides a significant increase in the archive dataset and suggest that the administrator repeats the search with the last 9 quarters.

By way of another example, if the administrator provided London and Liverpool as UK cities as search criteria in the first search, the archiving device 12 may find the smallest datasets for other UK cities (e.g., the 10 smallest datasets) which as a group represent a significant archive target but may represent a lower business impact and suggest that the administrator repeats the search based on the UK cities providing the 10 smallest datasets.

The processor 14 is configured to receive a user selection (e.g., from the administrator) to archive at least part of the dataset shown on the display device 26 (block 216), for example, by selecting one of the bars on a histogram. The processor 14 is configured to construct a data query (e.g., an XQL query) of the exact objects which will be deleted and archived to the archive storage unit 24. The processor 14 is configured to purge (at least part of) the dataset from the datastore 18 and archive (at least part of) the dataset into the archive storage unit 24 responsively to receiving the user selection (block 218).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system, comprising:
    a processor configured to:
        search a datastore to find records including a given field with a given value, the found records defining a dataset for consideration for archive having an aggregate data size;
        find an aggregate data size of a group of records not included in the dataset for consideration for archive;
        render to a display indications of: the aggregate data size of the dataset for consideration for archive; and the aggregate data size of the group of records not included in the dataset for consideration for archive;
        receive a user selection to archive at least part of the dataset; and
        purge the at least part of the dataset from the datastore and archive the at least part of the dataset into archive storage responsively to receiving the user selection; and
    a memory configured to store data used by the processor.

2. The system according to claim 1, wherein the processor is configured to repeat the search of the datastore one or more times based on new search criteria to further split the found dataset or provide a new dataset for consideration for archive.

3. The system according to claim 1, wherein the processor is configured to:
    find a data size of the dataset for consideration for archive for different time periods and a data size of the group of records not included in the dataset for consideration for archive for the different time periods; and
    render to the display a histogram indicating the data size of the dataset for consideration for archive by the different time periods and the data size of the group of records not included in the dataset for consideration for archive by the different time periods.

4. The system according to claim 1, wherein the processor is configured to divide the datastore into datasets based on any one or more of the following: an enumerated field; a numeric field; a free text string; data origin type; record status; and time period.

5. The system according to claim 4, wherein the processor is configured to divide the datastore into datasets based on the given value of, and/or an average of, a numeric field.

6. The system according to claim 1, wherein the processor is configured to search records of the datastore having different values of at least one field to find a maximum size dataset being defined by the records including the given field with the given value and defining the dataset for consideration for archive.

7. The system according to claim 6, wherein the processor is configured to:
    divide the maximum size dataset by different time periods to find a data size of the maximum size dataset for the different time periods; and
    render to the display a histogram indicating the data size of the maximum size dataset by the different time periods.

8. The system according to claim 1, wherein the processor is configured to:
    search records of the datastore having different values and different fields yielding a plurality of datasets for respective one of the fields with respective ones of the values; and
    select at least two largest data size ones of the datasets for consideration for archive.

9. The system according to claim 8, wherein the processor is configured to:
    divide the largest data size datasets by different time periods to find respective data sizes of the largest data size datasets for the different time periods; and
    render to the display histograms for each of the largest data size datasets indicating the respective data sizes of the largest data size datasets by the different time periods.

10. The system according to claim 8, wherein the processor is configured to:
    combine the largest data size datasets and find data sizes of the combined largest data size datasets for different time periods; and
    render to the display a histogram indicating the data size of the combined largest data size datasets by the different time periods.

11. A method, comprising:
    searching a datastore to find records including a given field with a given value, the found records defining a dataset for consideration for archive having an aggregate data size;
    finding an aggregate data size of a group of records not included in the dataset for consideration for archive;
    rendering to a display indications of: the aggregate data size of the dataset for consideration for archive; and the aggregate data size of the group of records not included in the dataset for consideration for archive;

receiving a user selection to archive at least part of the dataset; and purging the at least part of the dataset from the datastore and archive the at least part of the dataset into archive storage responsively to receiving the user selection.

12. The method according to claim 11, further comprising repeating the search of the datastore one or more times based on new search criteria to further split the found dataset or provide a new dataset for consideration for archive.

13. The method according to claim 11, wherein:
the finding includes finding a data size of the dataset for consideration for archive for different time periods and a data size of the group of records not included in the dataset for consideration for archive for the different time periods; and
the rendering includes rendering to the display a histogram indicating the data size of the dataset for consideration for archive by the different time periods and the data size of the group of records not included in the dataset for consideration for archive by the different time periods.

14. The method according to claim 11, further comprising dividing the datastore into datasets based on any one or more of the following: an enumerated field; a numeric field; a free text string; data origin type; record status; and time period.

15. The method according to claim 14, wherein the dividing includes dividing the datastore into datasets based on the given value of, and/or an average of, a numeric field.

16. The method according to claim 11, wherein the searching includes searching records of the datastore having different values of at least one field to find a maximum size dataset being defined by the records including the given field with the given value and defining the dataset for consideration for archive.

17. The method according to claim 16, further comprising dividing the maximum size dataset by different time periods to find a data size of the maximum size dataset for the different time periods, wherein the rendering includes rendering to the display a histogram indicating the data size of the maximum size dataset by the different time periods.

18. The method according to claim 11, wherein the searching includes searching records of the datastore having different values and different fields yielding a plurality of datasets for respective one of the fields with respective ones of the values, the method further comprising selecting at least two largest data size ones of the datasets for consideration for archive.

19. The method according to claim 18, further comprising dividing the largest data size datasets by different time periods to find respective data sizes of the largest data size datasets for the different time periods, wherein the rendering includes rendering to the display histograms for each of the largest data size datasets indicating the respective data sizes of the largest data size datasets by the different time periods.

20. The method according to claim 18, further comprising combining the largest data size datasets and find data sizes of the combined largest data size datasets for different time periods, wherein the rendering includes rendering to the display a histogram indicating the data size of the combined largest data size datasets by the different time periods.

21. A software product, comprising a non-transient computer-readable medium in which program instructions are stored, which instructions, when read by a central processing unit (CPU), cause the CPU to:
search a datastore to find records including a given field with a given value, the found records defining a dataset for consideration for archive having an aggregate data size;
find an aggregate data size of a group of records not included in the dataset for consideration for archive;
render to a display indications of: the aggregate data size of the dataset for consideration for archive; and the aggregate data size of the group of records not included in the dataset for consideration for archive;
receive a user selection to archive at least part of the dataset; and
purge the at least part of the dataset from the datastore and archive the at least part of the dataset into archive storage responsively to receiving the user selection.

* * * * *